Dec. 4, 1951  F. R. WILSON  2,577,669
HYDROMETER
Filed April 21, 1945  2 SHEETS—SHEET 1
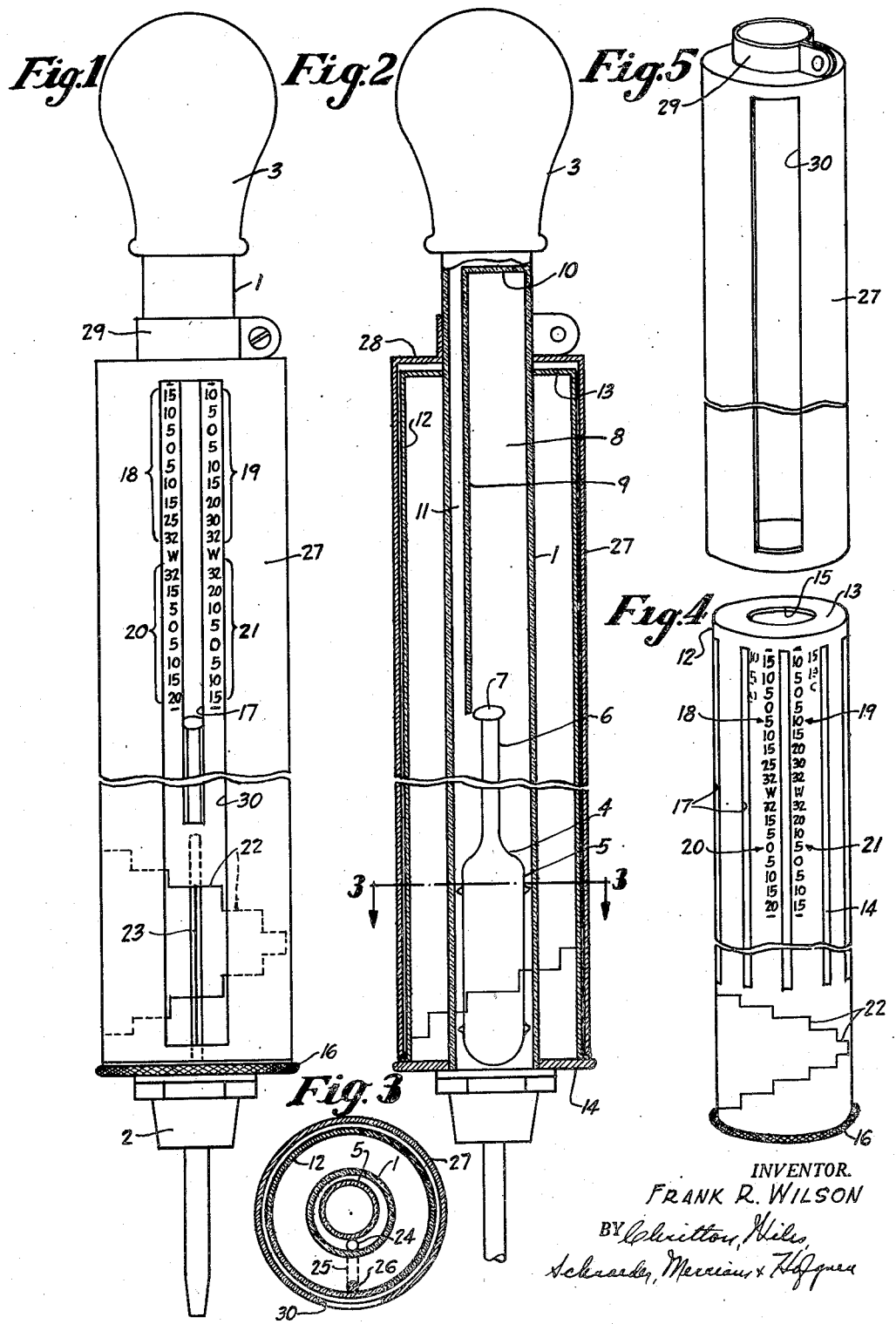
INVENTOR.
FRANK R. WILSON

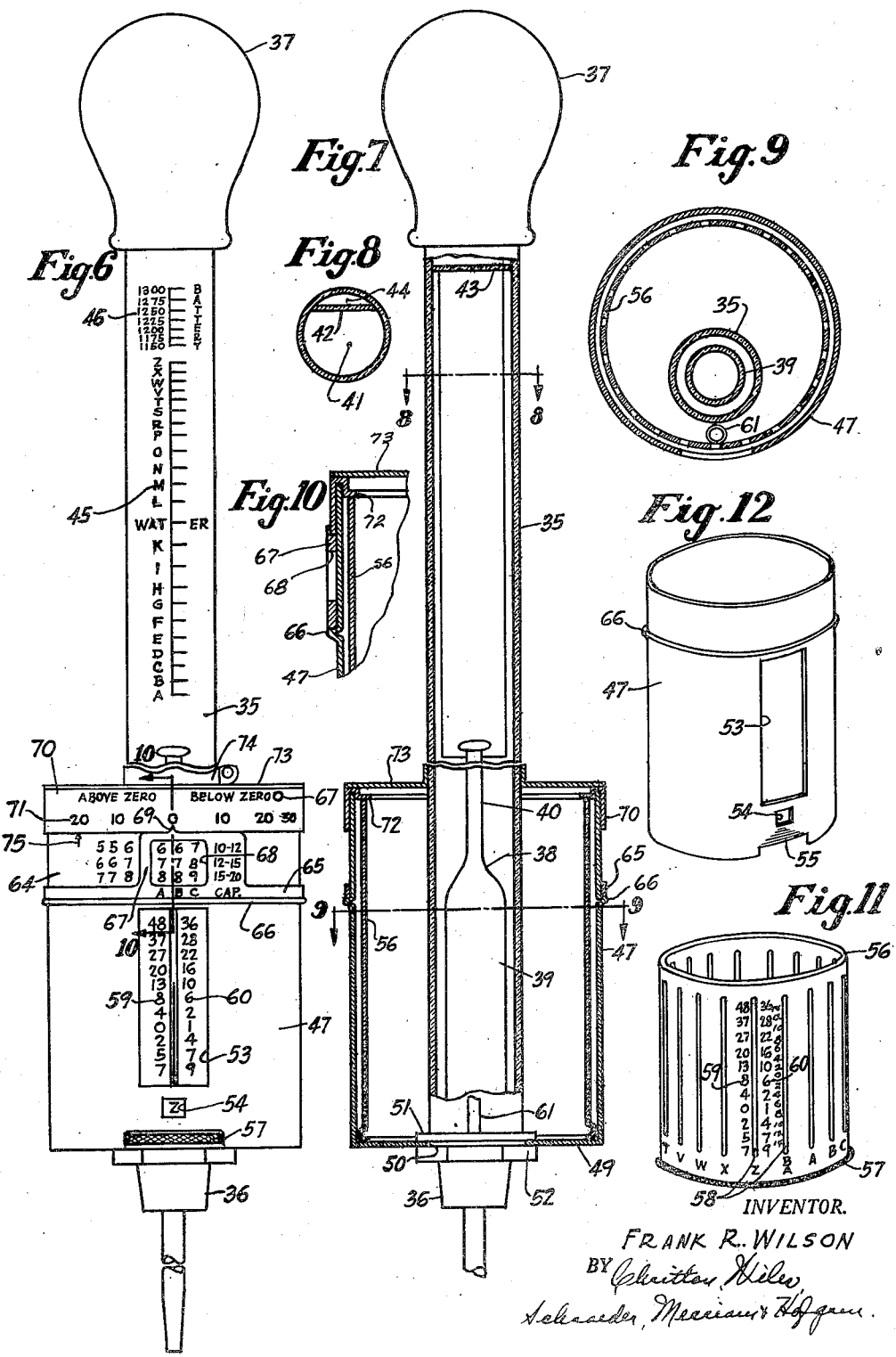

Patented Dec. 4, 1951

2,577,669

UNITED STATES PATENT OFFICE 2,577,669

HYDROMETER

Frank R. Wilson, Lexington, Ky.

Application April 21, 1945, Serial No. 589,485

11 Claims. (Cl. 73—34)

Tests made to determine the freezing temperature which the engine cooling fluids in automobile radiators will stand are usually made at any temperature that such fluids may happen to have at the time. It becomes necessary, therefore, to correct the ordinary hydrometer reading by a temperature factor. Moreover, the various antifreeze materials employed in reducing the temperature at which the fluids in automobile radiators will freeze vary as to characteristics and results produced. Thus, even with the particular antifreeze material in the radiator known, the determination of the temperature which the cooling fluid will withstand is still a tedious and time consuming process open to serious error. Complicating such testing of the cooling fluid is the fact that frequently the particular antifreeze material in the radiator is not known, or a variety of antifreeze materials may have been introduced from time to time. Under such circumstances, the testing of the cooling fluid by apparatus and methods heretofore known is doubly difficult and at times practically impossible.

It is an object of this invention, therefore, to provide a new and improved hydrometer by the use of which the faults of prior practices are overcome and the testing of the fluids in automobile radiators is made quick, easy and certain.

Another object of the invention is to provide a hydrometer that may be employed for testing automobile radiator fluids and from which a safe reading can be obtained, even though the particular antifreeze material in the radiator may not be known, or even though there may be a mixture of antifreeze materials in the radiator.

Another object is to provide a hydrometer of new and improved construction wherein a reading corrected as to the temperature of the fluid being tested may be obtained directly from the float of the hydrometer.

Another object is to provide a new and improved hydrometer which automatically differentiates between heavier than water and lighter than water antifreeze materials and, for either the heavier than water or lighter than water antifreeze materials, gives two readings obtainable directly from the float without reference to any other charts, which readings are corrected for the temperature of the fluid being tested.

Still another object is to provide a hydrometer adapted both for the testing of the fluids in automobile radiators, as well as testing batteries, with ready, easily manipulated means for correcting either test in accordance with the temperature of the fluid in the radiator or the electrolyte in the battery.

Not only has the determination of the freezing temperature which the fluid in the radiator will stand been a tedious and difficult task in the past, but the amount of antifreeze material to be added to cause the fluids to withstand certain temperatures has either been guess work or has required repeated testing after small additions of antifreeze material.

It is a further object of this invention, therefore, to incorporate in a hydrometer readily operable means for determining the quantity of antifreeze material that needs to be added to the cooling fluid in an automobile radiator to condition it for withstanding a specific, low temperature.

Other objects and advantages will become apparent from the following detailed description taken in connection with the accompanying drawings, in which:

Fig. 1 is an elevational view of a hydrometer embodying my invention in a simple, preferred form.

Fig. 2 is a longitudinal axial section through the device of Fig. 1.

Fig. 3 is a section on line 3—3 of Fig. 2.

Fig. 4 is a perspective view of a sleeve surrounding and rotatable on the barrel of the hydrometer, but on a smaller scale than Figs. 1 to 3.

Fig. 5 is a perspective view of a sleeve or shell, on the same scale as Fig. 4, that surrounds the other sleeve and is fixed to the barrel of the device.

Figs. 6 and 7 are views similar to Figs. 1 and 2, illustrating a modification.

Fig. 8 is a section on line 8—8 of Fig. 7.

Fig. 9 is a section on line 9—9 of Fig. 7.

Fig. 10 is a section, on a larger scale than Fig. 6, on line 10—10 of that figure.

Fig. 11 is a perspective view, on a smaller scale than Fig. 7, showing an inner, rotatable sleeve.

Fig. 12 is a perspective view, on the same scale as Fig. 11, of the stationary outer sleeve in Figs. 6 and 7, the calculator being omitted.

Referring first to the form of the invention shown in Figs. 1 to 5 of the drawings, the hydrometer comprises generally a glass tube or barrel 1 which carries at its lower end a more or less conventional tip or nozzle 2 made of rubber or rubber-like composition through which fluid to be tested is drawn into and discharged from the glass tube. At its upper end, the tube 1 carries the usual rubber bulb 3. Within the tube or barrel 1 is a float 4 having the conventional, enlarged bulb 5 at its lower end and an elongated, upwardly extending stem 6. The float, as is conventional, is free to move longitudinally of the tube in response to the level of and the buoyancy of the liquid drawn into the tube, and is centered with respect to the tube and held coaxial therewith in conventional manner.

In this form of the invention, the hydrometer is so constructed as to constitute what for convenience will be termed a "float reading" hydrometer, that is, a construction in which the temperature values that the solution tested will stand are read directly from the float, more particularly, in this instance, from the top of the float which may be formed to constitute a pointer 7. In order, therefore, that the level of the float may vary only with the specific gravity of the fluid being tested, and not also in accordance with the quantity of the fluid drawn into the barrel of the hydrometer, means is provided for readily obtaining a constant level of the fluid drawn into the barrel of the hydrometer. Herein this means takes the form of a chamber 8 closed at its upper end and open at its lower end, and formed by means of a partition having a portion 9 extending as a chord across the tube 1 and a portion 10 serving as a closure for the top of the chamber 8. It is believed readily apparent that the lower edge of the partition will determine the height to which the liquid will rise in all except that small passage 11 in the tube 1 which extends parallel with the chamber 8 and opens to the rubber bulb 3. As the liquid drawn into the tube rises to the bottom of the partition, the chamber 8 will be sealed by the liquid and hence there will be no further exhaustion of air from this chamber and no further rising of the liquid in the chamber, and thus there will be formed for all practical purposes a constant liquid level. The stem 6 of the float 5 will, of course, under proper conditions, pierce this level and pass into the chamber 8 so that, regardless of variation of the height of the column of liquid in the passage 11, the liquid having a buoyant effect on the float will always have the same level in the tube 1 when the hydrometer is properly operated.

With this construction, the level of the float will always be an indication of the specific gravity of the fluid being tested and the float and particularly some portion thereof may be employed as a pointer or indicator, and there is no longer any need to have the float itself contain some calibrated chart from which a reading indicative of the specific gravity of the fluid tested can be obtained. This factor is herein utilized to make possible a hydrometer which, in the first place, will give a reading, corrected as to temperature of the fluid tested, directly from the float, and in the second place a hydrometer which will enable a variety of antifreeze solutions to be tested and which will give a "safe" reading even when the particular antifreeze material in the liquid being tested is not known. To that end, there is rotatably mounted on the tube or barrel 1 a cylindrical sleeve, generally designated 12. The sleeve 12 is usually larger in diameter than the tube 1, the exact dimensions being determined by factors later to be made known, and is of a length to extend from the tip or nozzle 2 to a point somewhat short of the top of the tube 1. The sleeve has end walls 13 and 14 each formed with a central aperture 15 just slightly larger than the tube 1 and with the lower end of the sleeve formed with a radially outwardly projecting and knurled flange or bead 16. The sleeve 12 is rotatably supported in position by the tip or nozzle 2 of the hydrometer on which the lower end wall 14 of the sleeve 12 rests.

Over about two-thirds of the upper end the sleeve is formed with a plurality of longitudinal slots 17 uniformly spaced circumferentially of the sleeve. Each of the slots is just sufficiently wide to permit the head or pointer 7 on the upper end of the float to be viewed therethrough. Herein ten slots 17 are provided, though this number may be varied depending upon the fineness of the temperature factor adjustment to be made. Immediately adjacent each slot, the sleeve 12 carries four scales 18, 19, 20 and 21 composed of numerals indicating the temperature at which a solution being tested will freeze. The scales, therefore, run from 32° F., the freezing temperature of water, to progressively lower temperatures in both directions away from the symbol W, dividing the scales and representing the position which the top of the float will assume when a solution composed only of water is being tested. Certain antifreeze materials have a specific gravity higher than water and hence solutions composed of such materials and water will cause the float to assume higher and higher positions as the percentage of antifreeze material is increased, and hence the scales 18 and 19 indicate lower and lower freezing temperatures as one progresses up the scale from the symbol W. Conversely, where antifreeze materials having a specific gravity lighter than water are added, the float will take a lower and lower position as the percentage of antifreeze material increases, and hence the scales 20 and 21 indicate lower and lower freezing temperatures as one progresses downwardly from the symbol W. In the actual hydrometers, below zero readings of the scales will, of course, be indicated in some suitable, easily distinguishable manner, such as by the employment of red numerals. Herein minus signs have been placed at the ends of each of the vertical columns composed of the scales 18, 20 and 19, 21 to indicate that each of the four scales progresses from the letter W to successively lower temperature readings including below zero readings.

It is believed apparent from the foregoing that with the construction shown the hydrometer will automatically differentiate between lighter than water and heavier than water antifreeze material, so that it is not necessary for the individual testing the coolant fluid in a radiator to know whether the antifreeze material in the fluid is heavier than water or lighter than water. If desired, the scales may be calibrated for particular and well known antifreeze materials. For example, scale 18 may indicate the freezing temperatures that a solution containing the material known by the trade name "Prestone" will stand. The scale 19 could give the same indication for the material known by the trade name "Zerex," and scales 20 and 21 could give the readings for alcohol and methanol, respectively. Preferably, however, the scales do not indicate the freezing temperatures of solutions having any particular antifreeze material therein, but scales 18 and 20 are so calibrated as to indicate the temperatures which antifreeze materials giving the more protection will stand, whereas, the scales 19 and 21 are calibrated to indicate the temperatures which the commonly known antifreeze materials giving the lesser protection will stand. With this arrangement, the scales 19 and 21 will always give a "safe" reading which the operator of the vehicle can rely upon even though he is not aware of the particular antifreeze material in the radiator of his car.

The scales 18 to 20, inclusive, of course, are the readings corrected to a particular temperature of the solution being tested. Each of the slots 17, of course, has four such scales associated therewith with each slot and the scales associated therewith representing a different temperature of the solution being tested and with the scales properly calibrated to indicate the correct freezing temperature which the solution will stand. Means is provided herein for quickly and infallibly indicating to the operator which of the slots 17 and the scales associated therewith is to be employed in determining the freezing temperature of the solution being tested. To that end, the lower portion of the sleeve 12 is constructed of partially opaque and partially translucent or transparent materials to provide a plurality of visual steps 22 extending progressively circumferentially of the sleeve, each of said steps being at a different level above the bottom of the sleeve. If desired the visual steps may be provided by constructing the sleeve of opaque materials and cutting said sleeve away to form a plurality of windows extending progressively circumferentially of the sleeve and each being at a different level. The steps correspond in number to the number of slots 17 and each step is bisected by a longitudinal extension of the center line of the slot. Mounted in the tip or nozzle 2 is a thermometer 23 adapted for cooperation with the steps 22. The thermometer is generally L-shaped, having its bulb 24 disposed in the passage leading to the tube 1 so as to be subjected to the temperature of the solution being tested. From the bulb 24 a short or base leg 25 extends radially outwardly with the main or indicating portion 26 extending vertically upwardly to lie just within the sleeve 12. The thermometer and the sleeve 12 are so coordinated that when the sleeve is rotated to bring one of the steps 22 approximately to the level of the top of the column of temperature responsive fluid in the thermometer, the proper slot 17 with its associated scales will be presented to the view of the operator of the hydrometer.

The hydrometer is completed by a cylindrical housing 27 slightly larger than the sleeve 12 so as to be receivable over the sleeve and act as a protection therefor and also to mask all but one of the slots 17 and its associated scales. The housing 27 is open at its lower end but at its upper end is formed with an annular wall 28 and a split collar 29 by means of which the housing may be rigidly secured in a fixed position on the tube 1. Formed in the housing is an elongated slot 30 extending substantially from end to end of the housing so as to expose therethrough a portion of the entire sleeve 12 and the thermometer and float behind the sleeve. In width the slot 30 is made just wide enough to expose one set of scales when the corresponding slot 17 is centered in the slot 30.

The advantages and, particularly, the ease with which fluid may be tested become quickly apparent when the operation of the hydrometer is considered. The operation will, therefore, be described briefly. With a hydrometer constructed in accordance with this invention, a garage or gasoline station attendant can readily and quickly advise the operator of an automobile of the freezing temperature the solution in his radiator will stand. To determine this temperature, the operator draws into the hydrometer a sufficient quantity of the solution or coolant fluid to fill the tube at least up to the level of the lower end of the partition 9. The attendant need not spend any time in accurately adjusting the quantity of the fluid drawn into the hydrometer for a constant level of fluid effective to act on the float of the hydrometer is automatically assured by the construction of the hydrometer. Next the attendant simply rotates the sleeve 12 until some one of the steps 22 is adjacent or approximately adjacent the top of the column of temperature responsive fluid in the thermometer. With the main portion of the thermometer immediately behind the sleeve, this adjustment is readily and accurately made without possibility of error due to the angle or other factors at which the step and the column of fluid and the thermometer are sighted. With the rotation of the sleeve to bring a step 22 to the position above described, the proper slot 17 is brought into view through the slot 30 in the housing 27. The attendant then simply notes the figures opposite the top or pointer 7 of the float. It is not necessary that the operator know beforehand whether the antifreeze material in the coolant fluid is of the heavier or the lighter than water type, for the hydrometer as here constructed will give the correct reading for either. If the car owner knows the particular antifreeze material which he has in the car radiator, the attendant will know whether it is one of the better grades or one of the poorer grades of antifreeze materials. If it is one of the better grades, the attendant will advise the car owner that the solution will stand a temperature as indicated by the scale 18 or 20, depending upon where the pointer of the float is positioned. If it is one of the poorer grades, the attendant will take a figure from the scales 19 or 21. Should the car owner be completely ignorant of the brand of antifreeze material in his radiator, or should he advise the attendant that a variety of brands have from time to time been added, the attendant can by taking a figure from scales 19 or 21 advise the car owner of a "safe" temperature which his radiator fluid will withstand.

Thus it will be seen that the hydrometer herein disclosed obviates all necessity of taking a reading by the hydrometer, then taking a temperature reading, and then going to a chart and tracing one column horizontally across the chart and another column vertically of the chart to find the point of intersection, which will give the temperature which the solution will withstand, assuming, of course, that the antifreeze material in the solution is definitely known, with the attendant great possibility of error in making these several readings, interpolations, etc. Further, it provides at a glance a "safe" temperature when the antifreeze material in the solution tested is unknown. Without this hydrometer, such a "safe" temperature could be ascertained only by making the above laborious determination for each known antifreeze material and then taking the highest of the readings thus ascertained.

Referring now to the form of the invention shown in Figs. 6 to 12 of the drawings, the hydrometer comprises generally a glass tube or barrel 35 which carries at its lower end a more or less conventional tip or nozzle 36 made of rubber or rubber-like composition through which fluid to be tested is drawn into and discharged from the glass tube. At its upper end the tube 35 carries the usual rubber bulb 37. Within the tube or barrel 35 is a float 38 having the conventional, enlarged bulb 39 at its lower end and an elongated, upwardly extending stem 40. The float, as is conventional, is free to move longitudinally of the tube in response to the level of and the buoyancy of the liquid drawn into the tube, and is centered with respect to the tube and held coaxial therewith in conventional manner.

In this form of the invention, the hydrometer is so constructed as to constitute what for convenience will be termed a "thermometer" reading hydrometer, that is, a construction in which the temperature values that the solution tested will stand are read directly from the column of temperature responsive fluid of a thermometer which is subjected to the solution being tested. This form of the invention, moreover, is adapted also to test wet cell batteries and, additionally, includes means for readily calculating the amount of antifreeze material that must be added to a car radiator of given capacity in order that the resultant solution be capable of withstanding a specific freezing temperature.

To the above ends, the hydrometer is so constructed that the level of the float 38 will vary only with the specific gravity of the fluid being tested and not also in accordance with the quantity of fluid drawn into the barrel of the hydrometer. Means is provided for readily obtaining herein a constant level of fluid drawn into the hydrometer and effective to act on the float. Herein this means takes the form of a chamber 41 closed at its upper end and open at its lower end, and formed by means of a partition having a portion 42 extending as a chord across the tube 35, and portion 43 serving as a closure for the top of the chamber 41. It is believed readily apparent that the lower edge of the partition will determine the height to which the liquid will rise in all except that small passage 44 of the tube 35 which extends parallel with the chamber 41 and opens to the rubber bulb 37. As the liquid drawn into the tube rises to the bottom of the partition, the chamber 41 will be sealed by the liquid and hence there will be no further exhaustion of air from this chamber and no further rising of the liquid in the chamber, and thus there will be formed for all practical purposes a constant liquid level. The stem 40 of the float will, of course, under certain conditions, pierce this level and pass into the chamber 41 so that, regardless of variation of the height of the column of liquid in the passage 44, the liquid having a buoyant effect on the float will always have the same level when the hydrometer is properly operated.

With this construction, the level of the float will always be an indication of the specific gravity of the fluid being tested, and the float, and particularly some portion thereof, may be employed as a pointer or indicator and there is no longer any need to have the float itself contain some calibrated chart from which a reading indicative of the specific gravity of the fluid tested can be obtained. This factor is herein utilized to make possible a hydrometer adaptable both for testing coolant fluids in radiators and for testing wet cell batteries with the hydrometer for both types of tests giving an indication corrected by a temperature factor. To that end, the tube 35 proper carries a first scale 45 herein composed of letters, though it is to be understood any other type of symbol might be employed. Above the scale 45 the tube 35 carries a second scale 46 bearing numerals indicative of the charge on a battery.

Nonrotatably mounted on the lower end of the tube 35 so as not to interfere with any portion of the scale 45 is a cylindrical housing 47. This housing has a bottom wall 49 having an eccentrically positioned aperture 50 large enough to receive the tube 35 therein. The aperture 50 is eccentrically located in order to bring a particular portion of the housing as close to the tube 35 as possible, and the housing 47 is supported in fixed position on the tube by having the bottom wall 49 clamped between an annular shoulder 51 and a nut 52 forming a part of the nozzle or tip 36. The portion of the housing immediately adjacent the tube 35 is formed with a rectangular opening 53 disposed vertically and spaced upwardly a short distance from the bottom of the housing 47. Immediately below the opening 53 is a small, square opening 54, and beneath the opening 54 the housing is formed with an elongated, horizontally extending slot 55 and the housing is, moreover, depressed inwardly for a purpose that will presently be made known.

Rotatably mounted within the housing 47 and encircling the tube 35 is a cylindrical sleeve 56 just slightly smaller in diameter than the housing 47. At its lower end the sleeve 56 is formed with a knurled, radially outwardly extending bead or rib 557. This bead is very slightly smaller than the internal diameter of the housing 47 and thus acts as a guide retaining the sleeve in concentric relation to the housing and, of course, projects slightly through the slot 55 of the housing to adopt the sleeve for rotation by manipulation from the outside of the housing. Immediately adjacent the bead 57 the sleeve 56 carries a plurality of symbols, herein letters, corresponding to the symbols of the scale 45. These symbols are uniformly spaced around the sleeve and are visible through the square opening 54 in the housing 47. Vertically above each such symbol on the sleeve there is formed in the sleeve an elongated slot 58. Adjacent to and associated with each such slot 57 are two columns of figures 59 and 60 representing Fahrenheit temperatures at which the solution being tested will freeze. The slots 58 can be and are very narrow, and the opening 53 in the housing 47 has a width and length such that when one of the symbols on the lower end of the sleeve is centered in the opening 54 one of the slots 58 and its associated columns of figures 59 and 60 will be visible.

Mounted immediately behind the opening 53 and the sleeve 56 is a thermometer 61. This thermometer is preferably mounted externally of the tube 35 so as not to interfere with the float 38, but may also be mounted internally of the tube. The only essential is that the bulb of the thermometer be positioned in the tube or the tip 36 so as to be subjected to the fluid being tested. It will be seen from the foregoing that, when the sleeve 56 is rotated to any position in which one of the symbols carried by the sleeve is centered in the opening 54, there will be visible through the opening 53 not only one of the slots 58 and is associated columns 59 and 60, but also visible through the slot will be the column of temperature responsive fluid in the thermometer. The columns or scales 59 and 60 are so correlated with respect to the symbols on the scale 45 that the figure opposite the top of the temperature responsive fluid in the thermometer gives a reading of the freezing temperature which the solution will stand corrected to take into account the temperature at which the fluid was tested.

It is to be noted that the scale 45 is composed of two portions divided by the word "water." The upper portion will, of course, represent the readings utilized when a solution containing a heavier than water antifreeze material is being tested, while the lower portion will be utilized when solutions containing lighter than water antifreeze material are being tested. It is not necessary, however, that the garage or filling station attendant know whether the coolant fluid contains heavier or lighter than water antifreeze material, for that will automatically be indicated by the hydrometer. The columns or scale 59 and 60 can be calibrated to give readings for particular, commonly employed antifreeze materials, such as alcohol, methanol or the materials known by the trade names of "Prestone" or "Zerex." Preferably, however, the column 60 is so graduated as to give the temperatures that antifreeze materials giving the more protection will withstand, while column 59 is so calibrated as to give the temperatures which antifreeze material giving the lesser protection will withstand. When so calibrated, an attendant can always readily give to the owner of the car whose coolant fluid is being tested a figure which is a "safe" figure regardless of whether the particular antifreeze material in the coolant fluid is known or not.

The employment of the hydrometer constructed as herein described is extremely simple. All the attendant need do is to draw into the barrel 35 of the hydrometer a quantity of fluid, such that there is some rise of the fluid in the passage 44, thereby assuring that there is sufficient fluid drawn into the tube to enable the constant level feature of the tube to come into operation. The attendant then notes the symbol of the scale 45 opposite which the top of the float 38 comes to rest. The attendant then rotates the sleeve 56 until that particular symbol appears in the opening 54. The freezing temperature which the solution tested will withstand is readily obtained simply by noting the location of the top of the column of temperature responsive fluid of the thermometer. If the nature of the antifreeze material in the coolant is known and, moreover, is known to be one of the better grades, the attendant reads the figure in the column 60 which is opposite the top of the column of the temperature responsive fluid in the thermometer. If the antifreeze material is known to be one of the poorer grades, or if the material is unknown, then the corresponding figure from column 59 is utilized which, as above stated, will always give a "safe" reading. It is to be appreciated that the number of slots 58 and hence the number of charts associated therewith can be varied, depending upon the degree of fineness which the temperature of the solution being tested will withstand is to be determined. Further, it is to be appreciated that, while the housing and the sleeve have herein been described as having openings or slots, the same effect can, of course, be obtained by the employment of transparent material for the areas, since sight through the housing and the sleeve are the essential requirements and whether or not material is present or is not present is, of course, wholly immaterial.

Testing of a battery is effected in substantially the same manner as the testing of the coolant in a radiator. The electrolyte of the battery is drawn into the barrel of the hydrometer. The sleeve 56 is then rotated to bring into registry with the opening 53 a particular slot, herein designated by the symbol BA, which has associated with it a scale particularly designed for use in determining the charge on a battery being tested. After this scale has been brought into registry with the opening 53, the attendant notes the numeral which is opposite the top of the column of temperature responsive fluid in the thermometer. If this figure is above the zero in the column of figures, the figure is added to that particular one of the figures in the scale 46 opposite which the top of the float 38 has come to rest. If the top of the column of temperature responsive fluid of the thermometer is opposite one of the numerals below the zero in that column, that numeral is subtracted from the reading indicated by the top of the float. The resultant number then gives the charge on the battery corrected to take into consideration the temperature of the electrolyte being tested.

In order that the amount of antifreeze material necessary to be added to a radiator in order that the resultant solution will be able to withstand a specific freezing temperature may be taken out of the realm of pure guess work or a trial and error procedure, means is incorporated in this hydrometer whereby the quantity of antifreeze material to be added may readily and accurately be determined. To that end, there is nonrotatably mounted on the housing 47 above the opening 53 a chart 64 containing numbers representing quarts of antifreeze material, with the numbers arranged in groups and in horizontal and vertical columns. Herein each group is composed of nine figures, arranged in three horizontal and three vertical columns, with the horizontal columns representing divisions of radiator capacity, and with the vertical columns representing brands or grades of antifreeze material. It will be readily appreciated, of course, that these groups could be arranged to contain a lesser or a greater number of numerals, again depending upon the degree of precision desired in determining the result sought. Rotatably mounted on the housing externally thereof is a ring 65 adapted to be supported against downward movement by a bead 66 formed in the housing 47. The ring 65 has a widened portion 67 having an aperture 68 formed therein which is just large enough to encompass one group of the numerals of chart 64. To one side of the opening 68 the widened portion 67 may carry numbers indicating the capacity in quarts of a car radiator, and beneath the opening 68 may be symbols representing three common brands or grades of antifreeze material. The widened portion 67 is at its top edge and preferably approximately centrally of the opening 68 formed with a pointer 69. Also rotatable on the housing 57 is a second ring 70 carrying a scale 71 composed of numbers representing temperature values, both above and below zero. These numbers are so spaced as to correspond with the spacing of the groups of figures on the scale 64. The ring 70 preferably has its top edge bent first radially inwardly, then downwardly and then again radially inwardly (see Fig. 10) so as to form a flange 72 which serves to retain the sleeve 56 in proper position axially within the housing 47. To hold the ring 70 against loss off of the top of the housing, a disk 73 secured to the tube 35 by a collar 74 and extending radially outwardly to overlie the ring 70 is preferably provided. This disk at the same time forms a closure for the top of the housing 47.

To use the calculator just described, the garage attendant first tests the coolant in the radiator, especially if it is known or suspected that it already contains some antifreeze material. After it has been determined what temperature the coolant will withstand as then constituted, the attendant rotates the ring 70 so as to bring opposite an arrow 75 on the chart 64 that numeral of the scale 71 which is closest to the temperature just determined. For example, let it be assumed that the coolant will withstand a temperature of 20° F. The car owner is then asked for what temperature he wishes to fortify his coolant in the radiator. Let it be assumed, for example, that the car owner wishes to condition his car to withstand 0° F. The attendant then rotates the ring 65 to bring the pointer 69 opposite zero on the scale 71. As a result, there will be framed in the opening 68 figures indicating the number of quarts of various types of antifreeze material that must be added, depending upon the capacity of the radiator of the particular car, in order to condition the car to withstand zero temperatures. Again, by way of example, if the car has a radiator capacity of from twelve to fifteen quarts and the car owner wishes to employ an antifreeze material of the type of grade B, it will readily be seen that seven quarts of antifreeze material will have to be added.

It is believed that in the foregoing hydrometer there has been provided an instrument which, because of its utility to perform a variety of testing operations, will be unusually convenient and hence a great time saver. It also will save a great deal of time even in the testing of antifreeze solutions alone and, above all, will enable a determination to be made which at the present time cannot be made without very tedious and complicated efforts and thus usually is not made. Further, this hydrometer makes it possible for an attendant, while he is testing the coolant in a radiator, to advise the car owner quickly and accurately of the amount of antifreeze material that must be added in order for the coolant to be able to withstand a certain freezing temperature.

I claim as my invention:

1. A hydrometer device comprising a container for liquid provided with a compartment having an open lower end spaced a substantial distance above the bottom of the container, whereby air will be trapped in the compartment when the liquid rises above the lower end of the compartment, a float element in the container having a portion in position to rise within the compartment when liquid enters the container, a thermometer on the container to indicate the temperature of the liquid in the container, a member movable relatively to the container and having thereon a plurality of vertical scales differing from each other and each calibrated to give readings of the levels to which the float element rises, said member having visual steps adapted to register, one at a time, with the indexing element of the thermometer to select the scales in accordance with the temperature of the liquid in the container.

2. A hydrometer device comprising a cylindrical, transparent container for liquid, a float element in the container, the container having a downwardly opening compartment above said element to trap air within the same when liquid in the container rises above the lower end of the compartment, a long inner sleeve surrounding and rotatable on the container and having long, longitudinal slots spaced apart circumferentially of the sleeve, there being at least one scale along each slot to provide readings for different levels which the float element may reach, a stationary outer sleeve surrounding the inner sleeve and having therein a long window sufficiently wide to expose any one of said slots and the corresponding scale or scales when the slot is properly registered within the window, a thermometer for indicating the temperature of liquid in the container, the thermometer and the float element being so located that both are visible through said window when a slot and window register, and a visual gradient on said inner sleeve cooperating with the indexing element of the thermometer to select the particular slot which is to be exposed.

3. A hydrometer for testing the coolant in automobile radiators to determine the freezing temperature which the coolant will withstand comprising a container for the coolant to be tested including an elongated tube, means forming within the tube and at the upper end thereof when the hydrometer is held in vertical position a downwardly opening chamber operable to limit the rise of coolant within the chamber as the coolant to be tested is drawn into the container to provide a constant level of effective coolant, a float in the container having a stem portion operable to project into the downwardly opening chamber when coolant is drawn into the container, a thermometer associated with the container to be responsive to the temperature of the coolant drawn into the container and having a main portion extending parallel with the cylinder, and a sleeve rotatably mounted on the container, said sleeve being partly opaque and partly translucent and having at the portion opposite the thermometer a plurality of visual steps spaced longitudinally of the sleeve so that some one of the steps is adapted to be brought by rotation of the sleeve into approximate registry with the top of the column of temperature responsive fluid in the thermometer, said sleeve having a plurality of narrow, longitudinally extending windows in its upper portion, each window being associated one with each of said steps, and said sleeve having a scale associated with each of the windows indicating directly by noting the numeral on the scale opposite which the top of the float comes to rest the temperature which the coolant being tested will withstand, at least the portion of the tube opposite the window in the upper portion of the sleeve being transparent to permit the top of the float to be viewed therethrough.

4. A hydrometer for testing the coolant in automobile radiators to determine the freezing temperature which the coolant will withstand comprising a container for the coolant to be tested including an elongated tube, means forming within the tube and at the upper end thereof when the hydrometer is held in vertical position a downwardly opening chamber operable to limit the rise of coolant within the chamber as the coolant to be tested is drawn into the container to provide a constant level of effective coolant, a float in the container having a stem portion operable to project into the downwardly opening chamber when coolant is drawn into the container, a thermometer associated with the container to be responsive to the temperature of the coolant drawn into the container and having a main portion extending parallel with the container, and a sleeve rotatably mounted on the container, said sleeve being partly opaque and partly transparent and having at the portion opposite the thermometer a plurality of visual steps spaced longitudinally of the sleeve so that some one of the steps is adapted to be brought by rotation of the sleeve into approximate registry with the top of the column of the temperature responsive fluid in the thermometer, said sleeve having a plurality of narrow, longitudinally extending windows in its upper portion, each window being associated one with each of said steps, and said sleeve having four scales associated with each window and composed of numerals indicating temperatures, the scales extending along the window on opposite sides thereof with the upper two being utilized when liquids having a density greater than water are being tested, and the lower two being utilized when liquids having a density less than water are being tested and with the scales on one side of the window indicating optimum conditions and the scales on the other side of the window indicating minimum conditions, the tube being transparent to permit observation of the float through a window and the tube to obtain directly by noting the numeral opposite the top of the float the temperature which the coolant being tested will withstand.

5. A hydrometer device, including a cylindrical barrel, calibrated to indicate relative specific gravity of a series of liquids of different densities, by means of arbitrary characters, an inner sleeve surrounding and rotatable on the lower part of the barrel and having as many longitudinal slots spaced apart circumferentially of the sleeve as there are said arbitrary characters, there being a scale along each slot, each representing temperatures below which one of said different liquids may freeze, a stationary outer sleeve surrounding the inner sleeve and having therein a window sufficiently long and wide to expose one of the slots and its accompanying scale when that slot is properly registered with the window, a thermometer indicating the temperature of liquid in the barrel, the thermometer being so located that it is visible through the window and the slot registering with the window, whereby the temperature indicating element of the thermometer serves as a pointer cooperating with the scale beside the slot through which the thermometer is being viewed.

6. A hydrometer comprising an elongated tube, a float in said tube, means formed within the tube for buoying the float by a constant level of liquid when a minimum amount of liquid is drawn into said tube whereby the position of the float will be determined by the density of the liquid only, a pair of scales carried by said tube one utilized in the testing of radiator coolant fluid containing antifreeze material and the other in testing wet cell batteries, a thermometer associated with said tube to be disposed to the fluid therein having a main portion extending longitudinally of said tube, a sleeve rotatably mounted on said tube opposite the longitudinally extending portion of said thermometer and having a plurality of windows formed therein extending longitudinally of the sleeve through which said thermometer is visible when the sleeve is rotated to bring a window into registry with said thermometer, at least one scale composed of numbers indicating temperatures at which a liquid tested will freeze associated with each of said windows, a symbol on the sleeve associated with each of the windows corresponding to the symbols of the scale on said tube employed for testing liquids containing antifreeze material, whereby the temperature at which a solution containing antifreeze material may be obtained by noting the number on the sleeve opposite the top of the column of the temperature responsive fluid in the thermometer after the sleeve has first been rotated to bring into registry with the thermometer that window corresponding to the symbol on said tube opposite the top of said float, and a single one of said windows utilizable to effect temperature corrections when the hydrometer is being employed to test a wet cell battery.

7. In a hydrometer, a tube for receiving fluid to be tested, a float in said tube, a thermometer responsive to the temperature of the fluid drawn into said tube having a portion extending longitudinally of said tube, a cylindrical housing fixedly secured in surrounding relation to said tube having a bottom wall, a sleeve rotatably mounted within said housing resting on the bottom wall of said housing, an annular chart fixedly carried on said housing, a first annular member rotatably mounted in surrounding relation to said housing, said housing having an outwardly extending bead forming a support for said member, a second annular member rotatably mounted on said housing having a portion disposed externally of said housing and a portion internally of said housing, the portion internally of said housing serving to overlie the upper end of said sleeve and retain the same against longitudinal movement relative to said housing, said chart and said annular members cooperating to form a calculator for determining the quantity of antifreeze material to be added to the radiator of an automobile to fortify the coolant in the radiator to withstand a particular freezing temperature, and a disk-like member fixedly secured to said tube and extending radially outwardly to overlie said second annular member to hold the same against loss off of the upper end of said housing.

8. A combined tester and calculator for use in conditioning the coolant in automobile radiators to withstand certain freezing temperatures comprising, in combination, a hydrometer indicating directly thereon the temperature which a fluid being tested will withstand including a cylindrical housing, and means carried by said housing operable for calculating the amount of antifreeze material necessity to be added to fortify the coolant in an automobile radiator against a particular freezing temperature comprising an annular chart composed of groups of numerals divided into horizontal rows in accordance with ranges of automobile radiator capacities and into vertical rows representing antifreeze materials of different makes or characteristics, a first annular member rotatably mounted on said housing adjacent said chart and bearing indicia representing temperature values above and below 0° F. having a spacing corresponding to the spacing of the groups of figures of said chart, and a second annular member rotatably mounted on said housing having an enlarged portion with a window therein of a size to frame one of said groups of numbers of said chart, the enlarged portion of said second annular member bearing at one side of the window indicia indicating ranges of radiator capacity and positioned in horizontal lines coinciding with the horizontal lines of figures on said chart, and bearing beneath the window symbols representing different makes or grades of antifreeze material.

9. A hydrometer device comprising a cylindrical, transparent container for liquid, a float element in the container, the container having a downwardly opening compartment above said element to trap air within the same when liquid in the container rises above the lower end of the compartment, a long inner sleeve surrounding and rotatable on the container and having long, longitudinal slots spaced apart circumferentially of the sleeve, there being at least one scale along each slot to provide readings for different levels which the float element may reach, a stationary outer sleeve surrounding the inner sleeve and having therein a long window sufficiently wide to expose any one of said slots and the corresponding scale or scales when the slot is properly registered with the window, a thermometer for indicating the temperature of liquid in the container, the thermometer and the float element being so located that both are visible through said window when a slot and window register, and said inner sleeve having visual steps thereon cooperating with the indexing element of the thermometer to select the particular slot which is to be exposed.

10. A hydrometer for testing solutions having antifreeze material therein comprising a container for the solution to be tested including an elongated barrel of transparent material, a bulb fixed to one end of said barrel for expelling fluid from or drawing fluid into said container, means within the barel forming a chamber extending longitudinally of the barrel, the chamber being closed at the top and open at the bottom to form a trap for air preventing liquid from rising in the chamber when the barrel is filled above the bottom of the chamber, first indicating means comprising a float in said container, said float having a stem portion operable to enter the chamber, second indicating means comprising a thermometer extending longitudinally of said container and mounted to be responsive to the temperature of the liquid drawn into said container, and means for obtaining readings, corrected as to the temperature of the solution to be tested, indicating the freezing temperature of the solution by employing a reading obtained from noting the position of the upper end of said float, such last mentioned means comprising a member rotatably mounted on said container, said member having a plurality of longitudinally extending, circumferentially spaced, narrow sight openings disposed to have at least one of said indicating means visible therethrough and having a column of figures adjacent each opening for giving a reading of the freezing temperature which the solution will withstand, a casing for containing said rotatable member, said casing being non-rotatably mounted on said container and having a longitudinally extending sight opening through which one of the first mentioned sight openings and an associated column of figures of said rotatable member are visible, and said rotatable member having markings adapted to be brought into registration with the thermometer reading.

11. The hydrometer of claim 10 having therein means to determine the quantity of an antifreeze material that must be added to guard against freezing of an engine cooling solution at a given temperature lower than that indicated by a preliminary hydrometer reading, which comprises three long members arranged side by side, the first or central member being stationary and the other two being movable lengthwise of the first member, a row of numbers on and distributed lengthwise of the second member indicating temperatures from a point well above to a point well below 0° F., groups of numbers representing quarts distributed along the central member, the central member bearing a mark with which any number of the second member may be registered, a mark on the third member adapted to be caused to register with any number on the second member; and means on said third member to select one of the groups of numbers on the central member and a particular number in that group and indicating the number of quarts of antifreeze needed, depending on which of a plurality of types of antifreeze is under consideration and on the capacity of the cooling system, when the first-mentioned mark registers with the number corresponding to the hydrometer reading for the solution and the other mark registers with the number corresponding to the hydrometer reading desired for the solution.

FRANK R. WILSON.

REFERENCES CITED

The following references are of record in the file of this patent:

UNITED STATES PATENTS

| Number | Name | Date |
|---|---|---|
| 1,207,488 | Venable | Dec. 5, 1916 |
| 1,790,696 | Bridge | Feb. 3, 1931 |
| 2,154,604 | Perry | Mar. 28, 1939 |
| 2,288,561 | Webber | June 30, 1942 |
| 2,292,680 | Webber | Aug. 11, 1942 |
| 2,331,542 | Edelmann | Oct. 12, 1943 |
| 2,345,921 | Edelmann | Apr. 4, 1944 |
| 2,368,123 | Edelmann | Jan. 30, 1945 |
| 2,394,835 | Arant | Feb. 12, 1946 |